United States Patent [19]
Jones

[11] 4,075,785
[45] Feb. 28, 1978

[54] METHOD FOR HYDROPONIC GROWING OF LETTUCE

[75] Inventor: John L. Jones, San Angelo, Tex.

[73] Assignee: CanDu, Inc., Glendale, Ariz.

[21] Appl. No.: 539,498

[22] Filed: Jan. 8, 1975

Related U.S. Application Data

[63] Continuation of Ser. No. 297,323, Oct. 13, 1972, abandoned.

[51] Int. Cl.² .............................................. A01G 31/02
[52] U.S. Cl. ......................................... 47/64; 47/62; 47/82; 47/74
[58] Field of Search ...................................... 47/59–65, 47/74, 79, 82–83

[56] References Cited
U.S. PATENT DOCUMENTS

| | | | |
|---|---|---|---|
| 3,362,106 | 1/1968 | Goldring | 47/56 |
| 3,375,607 | 4/1968 | Melvold | 47/74 |
| 3,613,309 | 10/1971 | Coburn | 47/59 |
| 3,660,933 | 5/1972 | Wong | 47/63 |

Primary Examiner—Robert E. Bagwill
Attorney, Agent, or Firm—Sughrue, Rothwell, Mion, Zinn and Macpeak

[57] ABSTRACT

Various commercially valuable plants are grown by implanting a seed or cutting within a shaped porous root-permeable support body. The plant is periodically fed by applying a hydroponic nutrient solution to the plant roots growing through and depending from the shaped support body and the foliage of the plant is periodically exposed to actinic radiation. Root feeding and actinic radiation are continued until the plant reaches commercial maturity. In the case of those plants having valuable foliage, such as leafy vegetables, ornamentals, etc., the entire plant is shipped, stored and displayed for sale while the plant is still alive and growing in the moistened shaped support body which is enclosed in a vapor-barrier integument.

4 Claims, 18 Drawing Figures

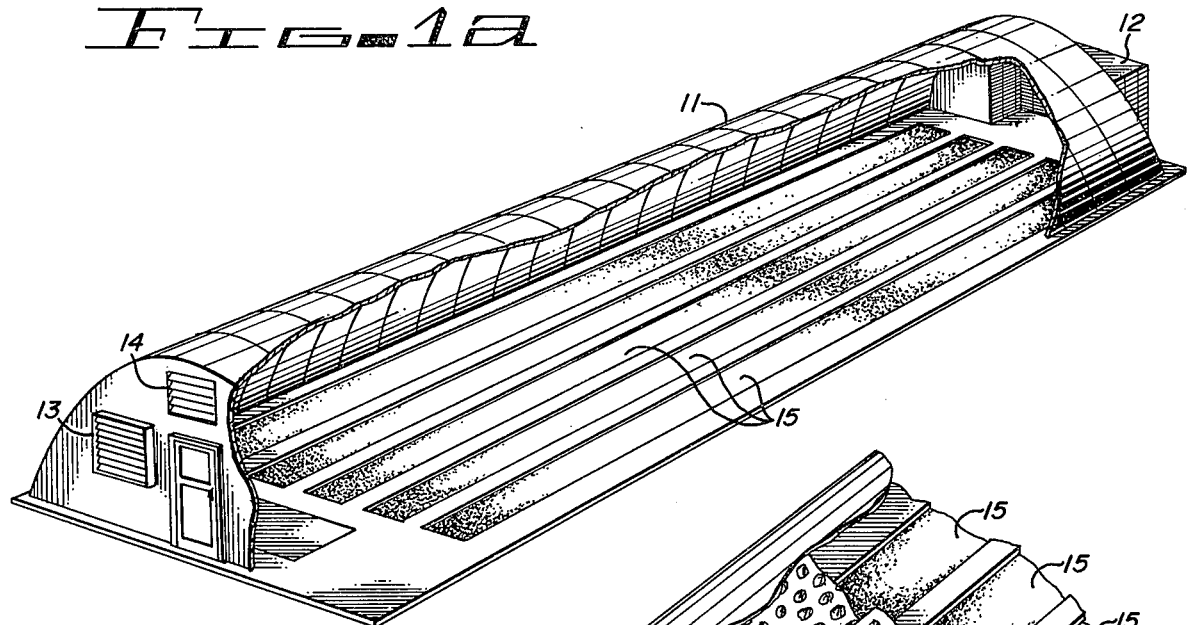
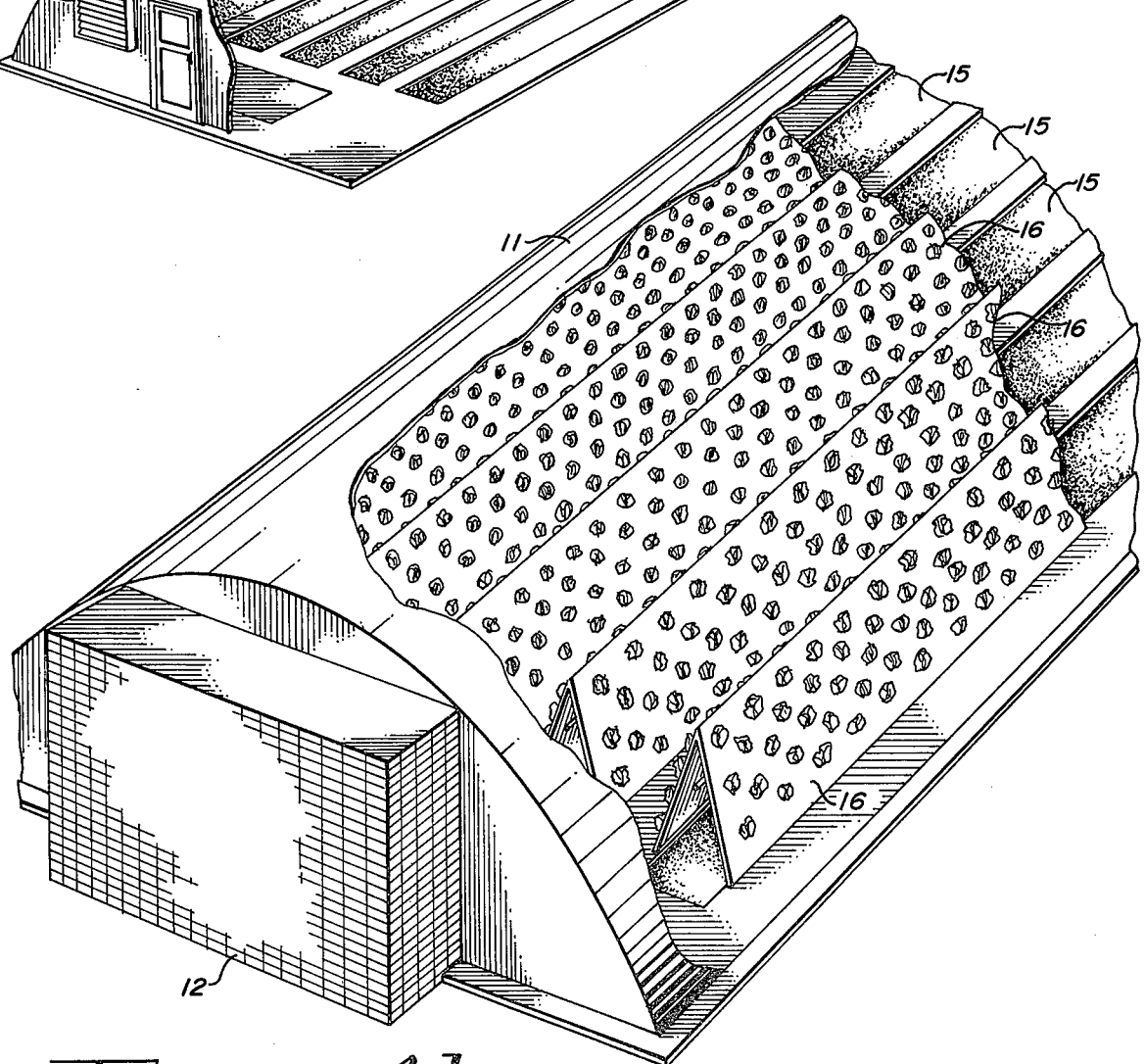

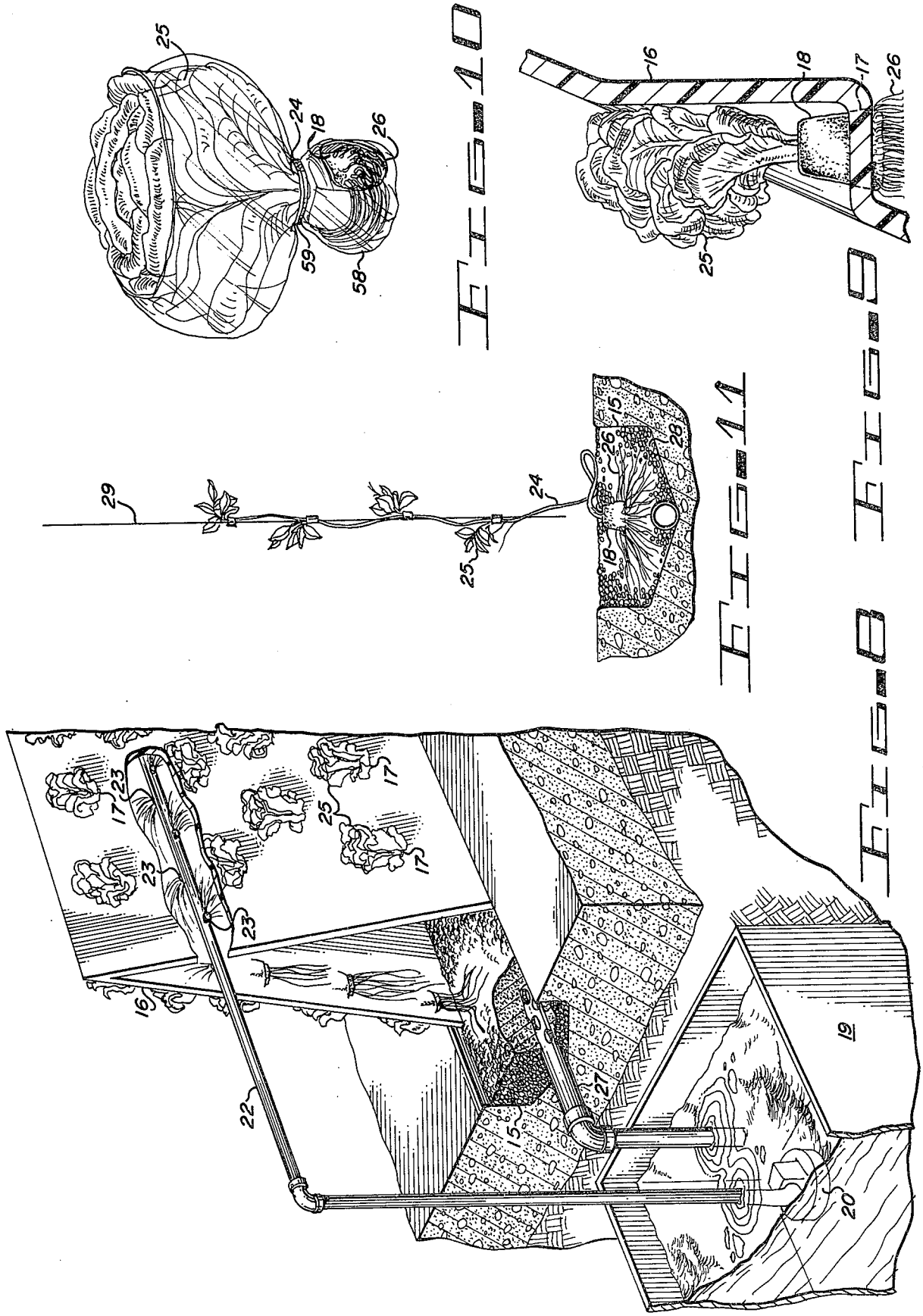

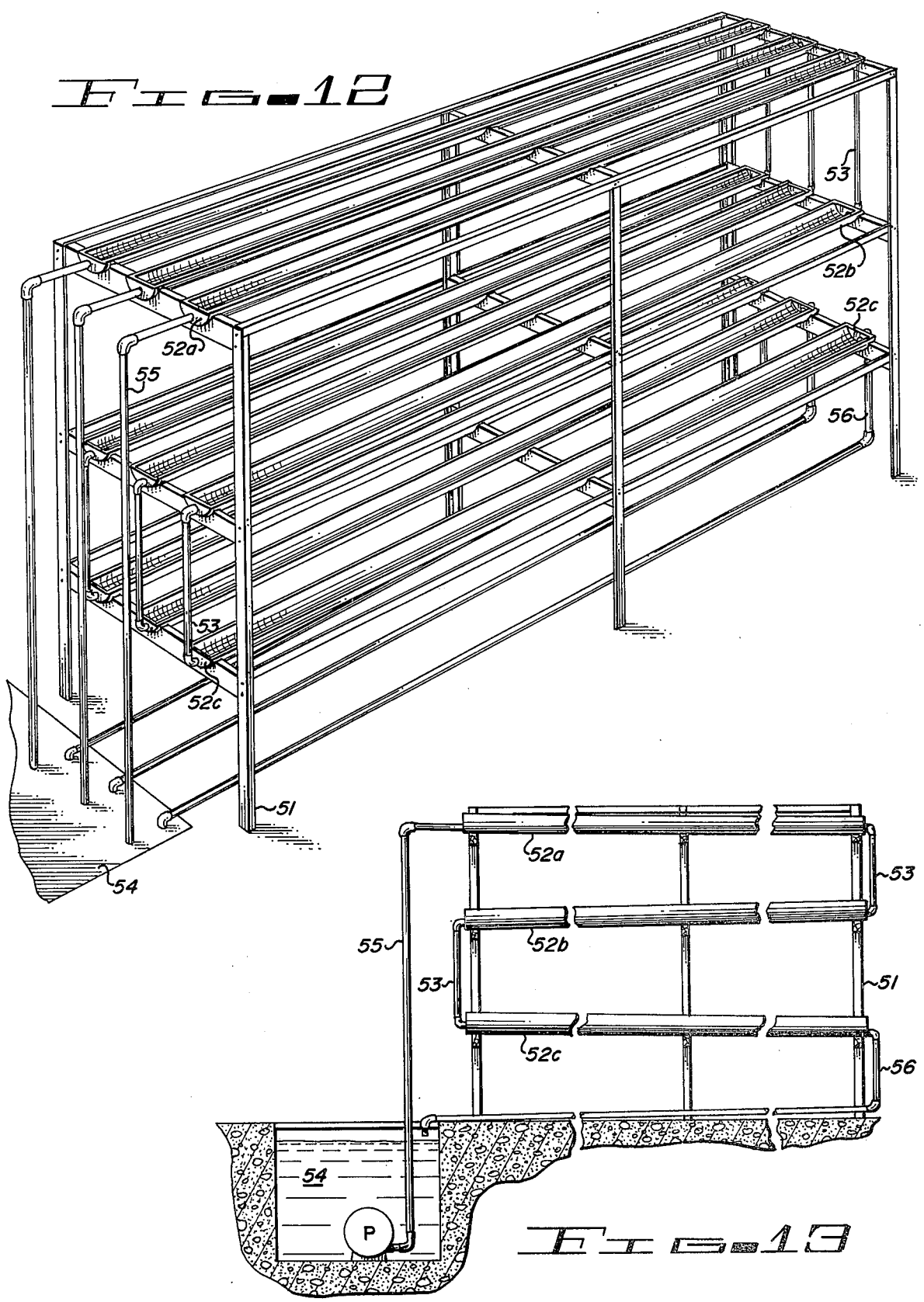

METHOD FOR HYDROPONIC GROWING OF LETTUCE

This is a continuation application based on my prior co-pending application Ser. No. 297,323, filed Oct. 13, 1972 and now abandoned.

This invention relates to the art and science of hydroponic horticulture.

More particularly, the invention concerns methods and apparatus for growing, transporting, storing and merchandising commercially valuable plants including fruits, vegetables and ornamentals such as flowers, shrubs, vines, etc.

In a particular respect, the invention relates to growing such plants using methods and apparatus specially adapted for large-scale commercial hydroponic growing operations.

In yet another respect, the invention is concerned with methods of growing, transporting, storing and merchandising plants which have commercially valuable stem structures, leaf structures, or both, for example leafy vegetables such as lettuce, endive, spinach, cabbage, and the like, plants having commercially valuable stem structures such as celery, rhubarb, etc., and plants in which the entire plant, or at least the stem and foliage, are commercially valuable such as flowers and other ornamentals and vegetables such as broccoli, etc.

In a specific respect, the invention pertains to methods and apparatus specially adapted for hydroponically growing vine fruit plants such as tomatoes, cucumbers, peppers, melons, eggplant, okra, etc.

In another important respect, the invention relates to packaged plants, grown either hydroponically or conventionally, which have substantially improved shelf-life.

For centuries, commercially valuable plants and plant products have been produced by substantially the same growing and harvesting techniques. Seeds or plant cuttings were embedded in the earth where the seed germinated or the cutting "rooted" under the influence of ambient soil moisture and temperature conditions. The development of the plant structure, including rooting, stem and foliage development, and fruit production, then proceeded as a result of natural plant metabolic mechanism including assimilation of soil and airborne nutrients, photosynthesis and transpiration. After the plant reached maturity, the valuable parts, i.e., fruit, stem, leaves or flowers, etc., depending on the nature of the plant, were harvested, transported, stored and merchandised.

According to one prior art technique, the natural growing and harvesting cycle is modified by germinating the seed and growing the plant to an intermediate stage in a specially adapted environment and then transplanting the intermediate plants ("seedlings") to another medium or environment for growing the seedlings to maturity.

According to another prior art technique, slips or cuttings from a relatively mature plant were bedded in a growing medium until a root system developed and the rooted cuttings were then transplanted to another growing medium to produce the mature plant.

According to the conventional "bare-root" transplant technique, the seedlings or cuttings were embedded in soil or other particulate root-support media to which fertilizers and other amendments were optionally added. The media was moistened to induce germination of the seed or rooting of the slip. The resulting seedling or rooted slip was then exposed to actinic radiation and further watering until the seedling reached transplant height. At that time, the entire seedling, including roots, was removed from the original growing medium and transplanted into natural soil for further growing where the plant grew to maturity under natural ambient growing conditions, optionally supplemented by watering and artificial fertilizers.

The "bare-root" transplant method was not entirely satisfactory. The plant trauma caused by the disturbance of the natural root system during transplanting, coupled with other disturbances in the growing environment, i.e., lack of moisture, physical damage to the plant and roots, etc., led to the death of an inordinate number of seedlings. To remedy this situation, the prior workers deliberately overplanted a field during transplanting and the crop was later thinned after it was determined which plants would survive.

More recently, in an attempt to reduce the mortality rate of transplanted seedlings, special shaped seedling support structures were devised. These shaped support bodies were generally constructed of a coherent root-permeable material such as specially treated cellulose, phenyl-formaldehyde foams, molded peat-waste paper-vermiculite compositions, etc., molded into blocks or other suitable shapes. Another prior art seed-support body was produced by encasing compressed peat in a plastic mesh. Fertilizers and other amendments were optionally incorporated into the seed-support bodies during manufacture.

Since the roots of the seedling initially grow within the support body, the plant trauma induced by bare-root transfers is virtually eliminated if the seedling is transplanted before it develops a substantial root system outside the support body. After transplantation into soil or other natural growing media, the support body is fractured and degraded as the natural root system continues to develop. After transplanting in natural soil, the plant is grown, harvested, transported, stored and merchandised by conventional methods.

It has now been discovered that the efficiency of commercial hydroponic operations can be greatly improved if shaped root-permeable support bodies are used to grow hydroponic plants to full commercial maturity. During the plant growth cycle, the blocks continue to function indefinitely as a support for the growing plant in the hydroponic growing bed until the plant reaches full commercial maturity. This discovery was very surprising since it had been previously considered that the growing blocks would only function to support a plant through the seedling or rooted-cutting stage. It was found, however, that the growing blocks were completely intact at the end of a complete crop cycle of several months, during which time the plants had grown to full commercial maturity. Plant trauma due to bare-root transplants had been completely avoided and several additional important advantages were obtained.

Since the shaped support bodies or blocks continued to function to support the plant throughout the entire growth cycle, the need for a root-support media such as gravel, sand or other particulate matter can be eliminated if desired, and the shaped support body and the plant growing therein can be positioned by any suitable means to allow application of a hydroponic nutrient solution to the plant roots while applying actinic radiation to the plant foliage. Furthermore, at the end of the commercial growth cycle, the entire plant, still growing in the support body, can be transported, stored and displayed for sale without terminating the growth of the plant. This is extremely important in connection with food crops such as leafy vegetables, plants having commercially valuable stem structures such as celery, rhubarb, etc., and other crops in which both the stem and foliage are commercially valuable such as flowers and other ornamentals and vegetables such as broccoli, etc. By this method, the need for refrigerated transportation and storage facilities is reduced or substantially eliminated and the "shelf life" of the produce is dramatically lengthened.

In addition to the important advantages mentioned above, the techniques herein disclosed also enable one to dramatically increase the productivity of hydroponic installations in relation to field-growing facilities. For example, it is presently estimated that the annual production rate of lettuce in an efficient hydroponic facility, using the techniques and apparatus herein disclosed, will be 10 – 30 times as great per unit area as a conventional field-farming facility.

Methods and apparatus used in practicing my invention and the presently preferred embodiments thereof will be apparent to those skilled in the art from the following detailed description of the invention taken in conjunction with the drawings, in which:

FIGS. 1A and 1B are partially cutaway perspective views of a hydroponic growing unit including apparatus specially adapted for growing lettuce and other leafy vegetable crops in accordance with the invention;

FIGS. 7 and 8 are views of a hydroponic growing bed provided with a special "A-frame" assembly adapted to receive shaped support bodies for the growing of lettuce and other leafy vegetables;

FIG. 9 is a cross-sectional view of the A-frame apparatus of FIGS. 7 and 8;

FIG. 10 is a head of lettuce grown in the apparatus of FIGS. 7–9 after it is harvested and wrapped for transportation and sale;

FIG. 11 is a cross-sectional view of a hydroponic growing bed depicting a vine crop supported by a growing block of FIG. 2 embedded in an aggregate;

FIG. 12 is a perspective view of another apparatus for growing leafy plants in accordance with the invention;

FIG. 13 is a side view of the apparatus of FIG. 12;

Briefly, in accordance with the invention, a method is provided for growing plants from seeds to commercial maturity. The steps of the method comprise implanting a plant seed within a porous root-permeable shaped support body, moistening the shaped support body until the seed germinates, the stem of the plant growing generally upwardly therefrom and the roots of the plant growing through the support body and generally outwardly and downwardly therefrom, positioning the shaped support body and plant growing therein for application of a hydroponic nutrient solution to the plant roots and for application of actinic radiation to the plant foliage, and periodically feeding the plant by applying hydroponic nutrient solution to the roots depending outwardly and downwardly from the shaped support body and periodically exposing the foliage to actinic radiation.

The feeding and exposure steps are continued until the plant reaches commercial maturity. In the case of plant products in which the stem, leaves, or both, are commercially valuable, the shaped support body and mature plant growing therein are removed from the feeding position and the support body is substantially enclosed in a vapor-barrier integument. These later steps provide a new article of manufacture comprising a shaped, porous, root-permeable support body, a mature leafy vegetable plant, the stem of which is supported in the shaped body, and a vapor-barrier integument substantially enclosing the shaped body. In this form, the article of manufacture is specially adapted for transportation, storage and display for sale.

Figure 2:
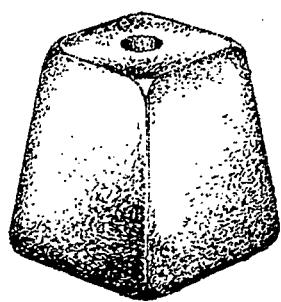
FIGS. 2–5 illustrate various shaped support bodies which are useful in practicing the invention.

As used herein, the term "porous root-permeable shaped body" means a discrete media of finite and substantially definite dimensions and having sufficient mechanical integrity and chemical stability to substantially withstand fracturing and degradation and maintain its general shape and dimensions as a seed implanted therein germinates and the resulting plant grows to commercial maturity, with the stem thereof extending generally upwardly from the shaped body and with the roots thereof growing through the media and extending outwardly and downwardly therefrom. By way of illustration and without limitation on the scope of the foregoing definition, FIGS. 2–6 illustrate shaped support bodies which are useful in practicing the invention. FIG. 2 illustrates the presently preferred embodiment which is generally known as a growing "block". Such blocks are disclosed in U.S. Pat. Nos. 3,467,609 to Adams et al., 3,513,593 to Beck, and 3,524,279 to Adams. Such blocks are commercially available under the trademarks "BR-8", "Kys Cube", "Oasis 902", and "Quickee Sure Start". Such blocks are manufactured by molding a graft copolymerized wood pulpacrylanitrile composition, phenol-formaldehyde foams and a peat-wastepaper-vermiculite composition.

Figure 3:
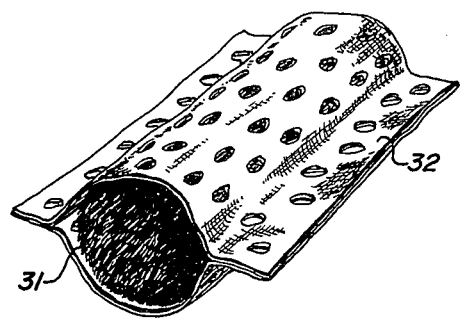
Figure 4:
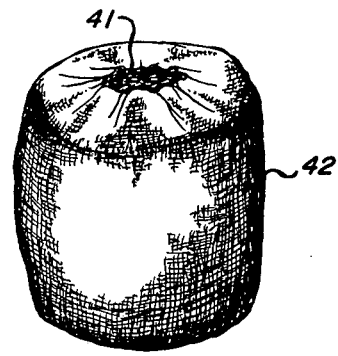
Figure 5:
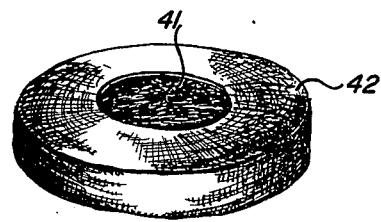

FIG. 3 illustrates another shaped support body consisting of compressed peat pellet 31 encased in perforated plastic 32. FIG. 4 illustrates a similar product consisting of a compressed peat core 41 encased in a plastic mesh covering 42. Prior to the time it is first wetted, the support body of FIG. 4 has the shape illustrated in FIG. 5. Wetting causes the support body of FIG. 5 to swell, assuming the shape shown in FIG. 4. In the device of FIG. 3, the peat core 31 is flattened and upon wetting swells to assume the shape shown in FIG. 3.

As will be observed, the exact shape of the support body is not critical. The media material can either by molded to a shape-retaining form or the media may be enclosed in a porous shape-retaining integument. The blocks of FIG. 2 are preferred since they are easier to handle and provide somewhat greater mechanical integrity, a property which is desired as will be apparent from the following description of other aspects of the invention.

As distinguished from the prior art use of growing blocks and other shaped support bodies, the present invention contemplates continuing the growth of the plant in the support body until the plant forms a substantial root system outside the support body while feeding the plant by direct periodic application of a hydroponic nutrient solution to these external roots and while periodically exposing the plant foliage to actinic radiation until the plant reaches commercial maturity. The term "commercial maturity" used herein means the stage at which the plant itself has grown to the point that a portion, or all, of the plant is useable for the ultimate purpose for which the plant is commercially cultivated, as distinguished from an intermediate stage when the growing plant is commercially valuable only for the purpose of further growth, i.e., a seedling or cutting. For example, the growth of vine-fruit vegetable plants would be continued in the practice of this invention until the vegetables, such as tomatoes, cucumbers, peppers, melons, eggplant, okra, etc., are ready for picking and until it is time to terminate the plant growth due to economic factors such as decreased yield, quality of fruit, etc. In the case of leafy vegetables, plant growth would be continued according to the practice of this invention until the foliage, such as the leaves of spinach, lettuce, endive, cabbage, etc., have reached the harvesting stage. Plants such as flowers and other ornamentals and vegetables such as broccoli and cauliflower are grown in accordance with this invention until the flowers or ornamentals have substantially reached the full stage of aesthetic appearance or until the vegetable plants have reached the harvesting stage.

Figure 7:
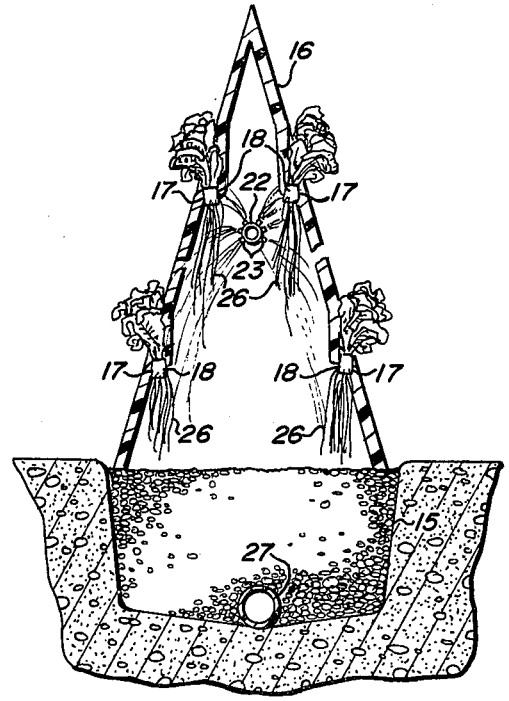

FIGS. 1A and 1B generally depict respectively the front and rear views of a hydroponic growing unit of a type which is in current use provided with apparatus useful in practicing an embodiment of the invention. The hydroponic growing unit generally consists of an arcuately shaped roof 11 formed of fiberglass-reinforced plastic material which is transparent to actinic solar radiation. The growing unit is provided with appropriate temperature and humidity sensors to measure the temperature and humidity of the air within the unit. When required, the air is cooled by drawing ambient air through an evaporative cooler 12 located at the rear of the growing unit. Air drawn through the evaporative cooler 12 is exhausted through louvered openings 13. Uncooled ambient air is drawn into the growing unit through the louvered opening 14 at the front of the growing unit and can be heated, if required, by a furnace located inside the growing unit. A series of parallel longitudinal hydroponic growing beds 15 (see FIG. 1) are located at ground level inside the growing unit and an appropriate array of pumps and piping supplies hydroponic nutrient solution to the growing beds from a sump located beneath the floor at the front of the unit. As shown in FIG. 1A, an A-frame support structure 16 is erected over each of the longitudinal growing beds 15. The A-frame support structure and associated equipment are further described in FIGS. 7-9. The A-frame structure may be formed of any suitable material, preferably of foamed polystyrene boards provided with rows of openings 17 shaped to frictionally engage and support a series of shaped root-permeable support bodies 18 such as, for example, those shown in FIG. 2. A plant seed, such as a lettuce seed, is implanted within the support bodies or growing blocks 18, after which the blocks are inserted in the holes 17. Hydroponic nutrient solution from a sump 19 is conveyed by means of a pump 20 through a conduit 22 provided with appropriate spray heads 23. The nutrient solution is sprayed in the interior of the A-frame, wetting the growing blocks 18 and causing the seed to germinate. The stem 24 of the plant and foliage 25 grow generally upwardly from the blocks 18 and the roots 25 of the plant grow generally outwardly and downwardly from the block 18. As shown in FIGS. 7-9, it is only necessary that the shaped support body or growing block 18 be positioned properly to periodically apply the hydroponic nutrient solution to the plant roots 26 while maintaining the foliage 25 of the plant in such position that actinic radiation passing through the transparent arcuately shaped roof 11 (FIG. 1) is diurnally applied to the foliage 25. The interval of application of hydroponic solution to the plant roots 26 can be varied to suit the particular plants involved, the principal determining factor being the necessity of preventing the drying of the plant roots.

Figure 6:
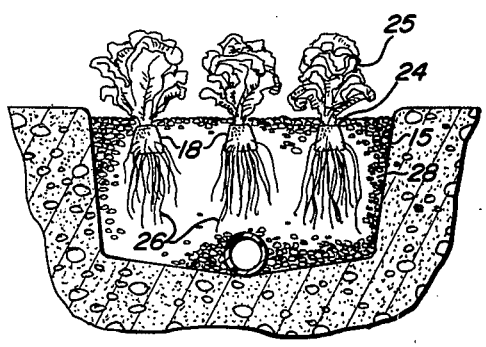
FIG. 6 is a cross-sectional view of a hydroponic growing bed showing plants supported by growing blocks as illustrated in FIG. 2 embedded in an aggregate.

As will be observed, the method and apparatus illustrated in FIG. 1 and FIGS. 7-9 effectively increase the available growing area inside the hydroponic unit by several orders of magnitude, up to approximately 1400%. However, as shown in FIG. 6 and FIG. 11, if the plants require more actinic radiation for proper growth, the growing blocks 18 can be properly supported by particulate aggregate 28 which fills the growing bed 15. As shown in FIGS. 6 and 11, the stem 24 and foliage 25 of a plant grow generally upwardly from the growing block 18 and the roots 26 grow outwardly and downwardly from the growing block 18 through the aggregate 28. Hydroponic nutrient solution is applied to the roots 26 by either periodically flooding the growing bed 15 according to the so-called "gravel-culture" system or by circulating the nutrient solution through the aggregate 28 according to the so-called "drip-culture" system.

As shown in FIG. 11, the stem 24 of a vine plant can be supported by clipping it to a suitable cord 29 or other support above the growing bed 15. In this manner, the foliage 25 (FIGS. 6, 11) is properly exposed to diurnal actinic radiation.

Another method which is presently preferred for supporting the shaped porous root-permeable support bodies for application of nutrient solution to the roots of leafy or non-vining plants and exposure of the plant foliage to actinic radiation is illustrated in FIGS. 12-15, which depict a frame 51 which supports a plurality of elongate channel members 52, each of which is slightly inclined. As shown more clearly in FIGS. 13 and 15, each of the inclined troughs 52 in a vertical row are interconnected by pipes 53 such that hydroponic nutrient solution from a sump 54 which is periodically pumped through an inlet conduit 55 into the uppermost trough 52a drains successively into the next-lower troughs and finally drains through outlet conduit 56 back to the sump 54.

Figure 14:
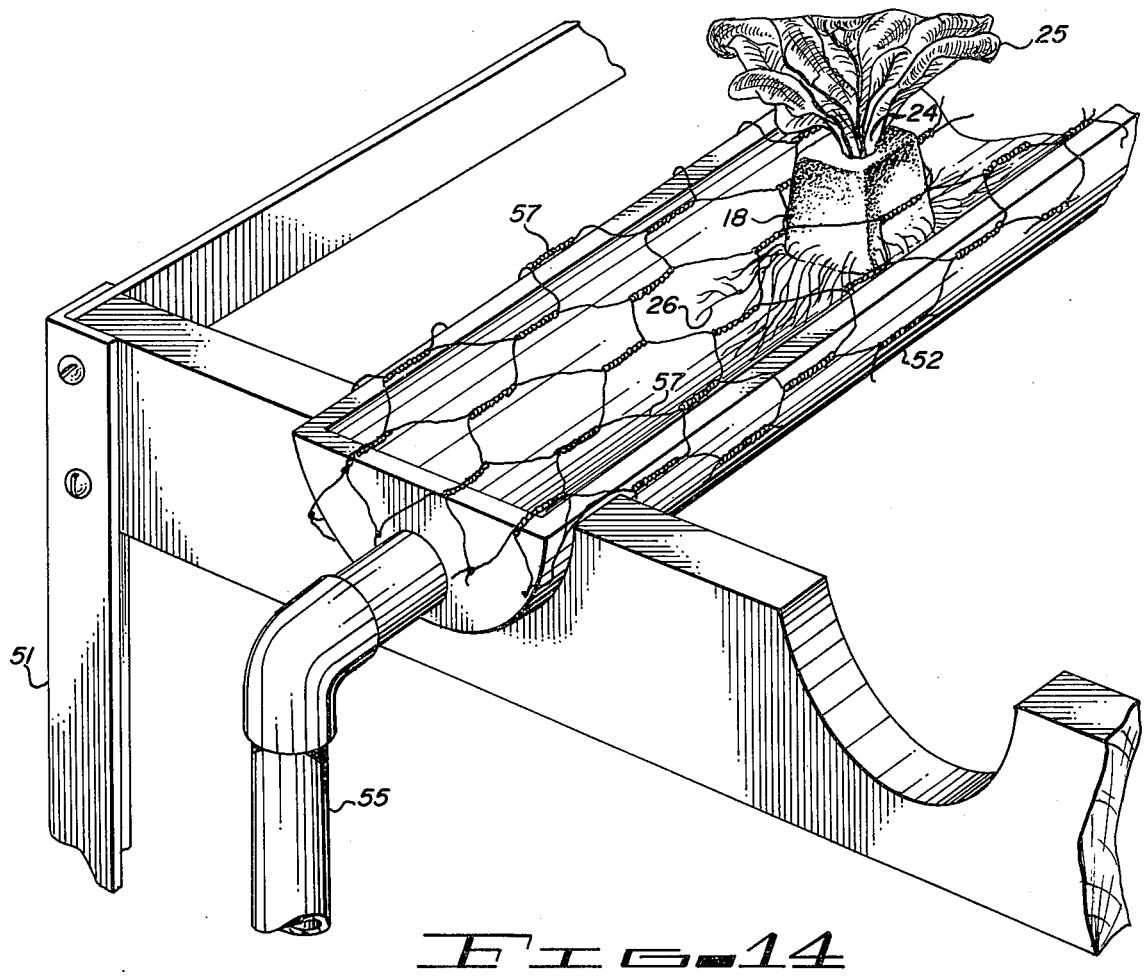
FIG. 14 is a more detailed perspective view of the apparatus of FIGS. 12 and 13 showing the method of positioning the support body and plant growing therein for hydroponic feeding.
Figure 15:
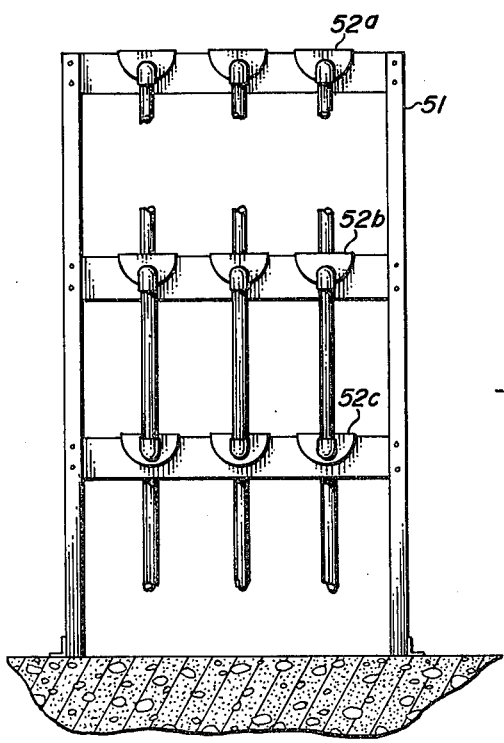
FIG. 15 is an end view of the apparatus of FIGS. 12–14.

Referring more specifically to FIG. 14, the root-permeable shaped support bodies or blocks 18 are positioned within the troughs 52 by any suitable technique such as, for example, a chicken wire net 57 stretched over and wrapped around the trough 52. In this manner, the roots 26 of the plant are disposed in the trough 52 and are periodically flooded by the nutrient solution entering the trough through the inlet pipe 15 while the stem 24 grows upwardly from the block 18 supporting the foliage 25 such that it is periodically exposed to actinic radiation. As will be apparent, the apparatus of FIGS. 12-15 can be used in a hydroponic growing unit which does not have any growing beds since the nutrient solution is pumped directly from the sump 54 and any excess is returned directly to the sump 54. The lateral and vertical spacing of the troughs 52 can be varied as required to permit each plant to receive its appropriate dose of actinic radiation which may be natural solar radiation or which may be supplied from an artificial source such as electrical lights (not shown) located above and between the horizontal rows of troughs 52.

From the foregoing description it will be apparent to those skilled in the art that the porous shaped root-permeable support bodies may be properly positioned in accordance with the invention in a wide variety of ways. The particular method of support is not critical so long as the block and the plant growing therein are positioned so that hydroponic solution can be periodically applied to the roots and such that the foliage of the plant can receive the proper periodic doses of actinic radiation.

A new article of manufacture is provided according to another embodiment of the invention. As shown in FIG. 10, a leafy vegetable can be conveniently harvested and packaged for shipment and display for sale. The moist block 18 is substantially enclosed by a vapor-barrier integument 58 such as polyethylene food-wrap film secured around the stem 24 of the plant by means of any suitable closure device 59 such as a rubber band, twist-tie, string, or the like, to substantially reduce the rate of evaporation of nutrient solution from the moist block and retard the rate at which the roots dry out. Preferably, the integument material extends upwardly from the stem 24 and at least partially encloses the foliage of the plant 25. The resulting packaged leafy vegetable actually stays alive and continues to grow for a substantial period of time such that the produce remains fresh and saleable for a substantially longer period of time than conventionally harvested and packaged produce.

Figure 16:
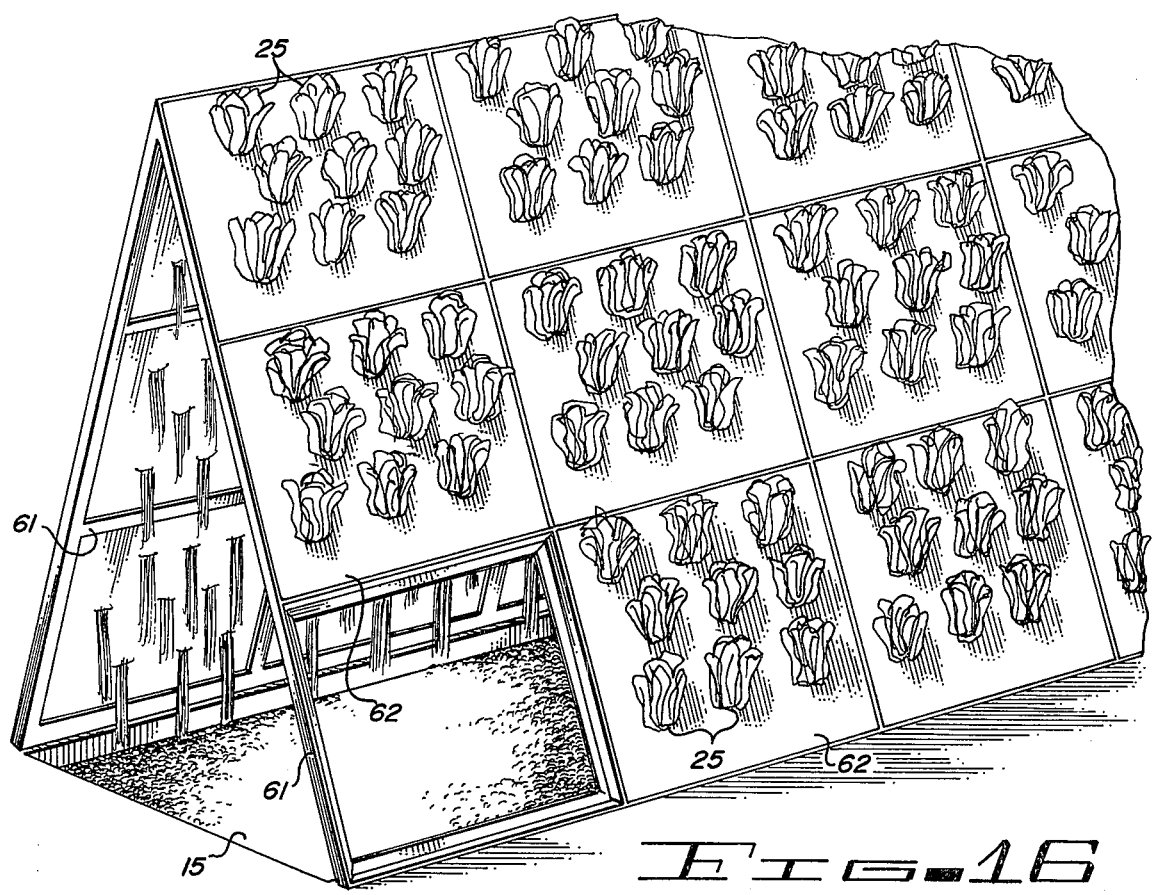
FIG. 16 is a perspective view showing an alternate form of the "A-frame" assembly of FIGS. 7–8.
Figure 17:
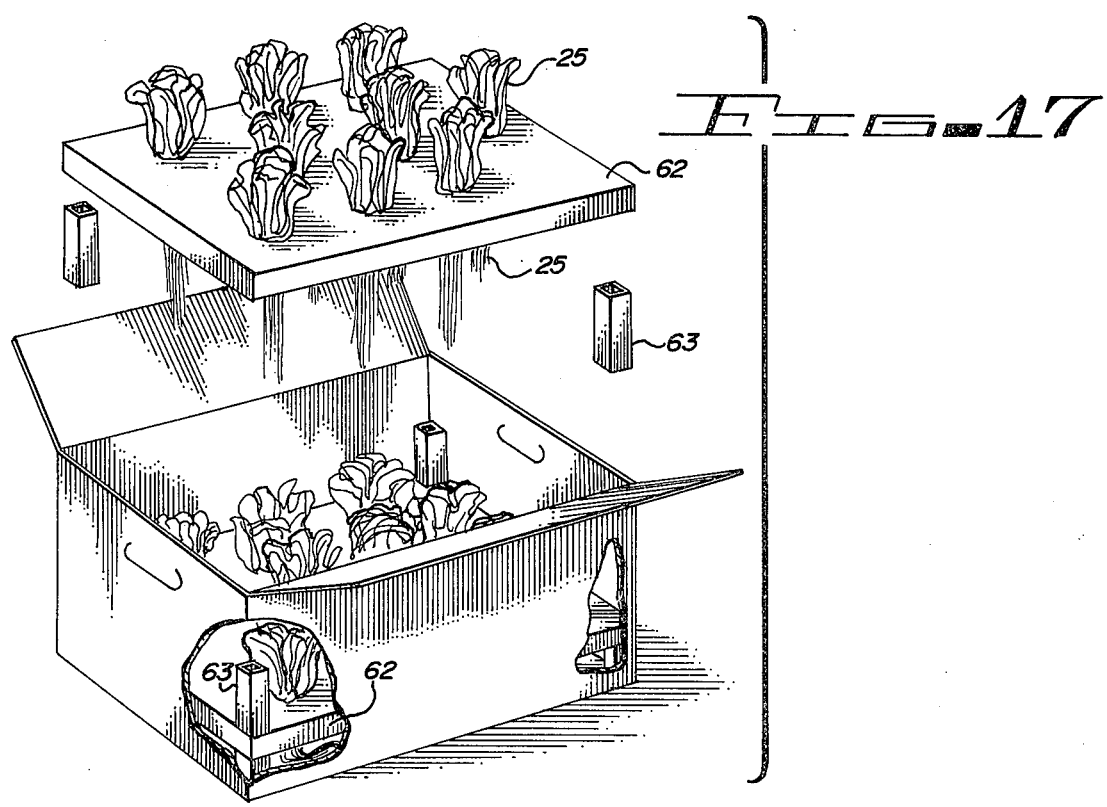
FIG. 17 is an exploded perspective view of a packing carton for transporting produce grown on the apparatus of FIG. 16.

FIG. 16 illustrates a modified form of the A-frame apparatus. The A-frame is constructed of channel members 61 sized and shaped to receive styrofoam panels 62 having recesses to accommodate the growing blocks. After plants 25 have reached the harvest stage, the panels 62 are removed from the A-frame 61 and placed in shipping cartons. As shown in FIG. 17, the panels 62 are sized to be received in a shipping carton. The panels 62 are supported within the shipping carton by appropriate spacer members 63 to prevent crushing the plants. In this manner, the produce can be shipped to the retail grocery store without removing the plants from the panels 63 and with a bare minimum of hand-labor.

In an alternate embodiment of the invention, the entire A-frame apparatus 61 remains in the hydroponic growing unit until the plants 25 reach commercial maturity, at which time the entire A-frame assembly is transported to the retail grocery store. At the retail grocery store, the plants can be maintained in a completely fresh condition for extended periods of time if the roots of the plants are sprayed periodically to prevent their drying out. The panels 62 can be removed from the A-frame 61 and placed in the produce showcase while the rest of the panels 62 remain on the A-frame 61 until needed.

Having described my invention and the presently preferred embodiments thereof in such full, clear and concise terms as to enable those skilled in the art to understand and practice the same, I claim:

1. A method for growing lettuce from seeds to commercial maturity, comprising:
   a. implanting a lettuce seed within a porous root-permeable shaped support body;
   b. moistening said shaped support body until said seed germinates, the stem and leaves of said lettuce plant growing generally upwardly therefrom and the roots of said lettuce plant growing through and outside said support body and generally outwardly and downwardly therefrom;
   c. positioning said shaped support body and lettuce plant growing therein for application of a hydroponic nutrient solution to the lettuce plant roots growing outside and outwardly and downwardly from said support body and for application of actinic radiation to the lettuce plant foliage;
   d. periodically
      1. feeding said lettuce plant by applying hydroponic nutrient solution to the roots growing outside and depending outwardly and downwardly from said shaped support body, and
      2. exposing said lettuce plant foliage to actinic radiation,
   at least until said plant reaches commercial maturity; and
   e. harvesting said commercially mature plant prior to bolting by removing said plant from the growing position without separating said support body and roots growing therethrough from said commercially mature plant, and enclosing said shaped body and at least a portion of said plant in a vapor-barrier integument.

2. A method as in claim 1, wherein said positioning is such that the body is held in a vertically extending support structure at a position disposed above nutrient solution collection means, whereby solution applied to said roots readily drains therefrom.

3. A method as in claim 1, wherein said solution is recirculated throughout said feeding.

4. A method as in claim 1, wherein said vapor-barrier integument is polyethylene film.

* * * * *